US012015702B2

(12) United States Patent
Jeuk

(10) Patent No.: US 12,015,702 B2
(45) Date of Patent: Jun. 18, 2024

(54) KEY SHARING FOR MEDIA FRAMES USING BLOCKCHAIN

(71) Applicant: Cisco Technology, Inc., San Jose, CA (US)

(72) Inventor: Sebastian Jeuk, Munich (DE)

(73) Assignee: Cisco Technology, Inc., San Jose, CA (US)

(*) Notice: Subject to any disclaimer, the term of this patent is extended or adjusted under 35 U.S.C. 154(b) by 416 days.

(21) Appl. No.: 17/349,816

(22) Filed: Jun. 16, 2021

(65) Prior Publication Data

US 2022/0407689 A1  Dec. 22, 2022

(51) Int. Cl.
*H04L 9/08* (2006.01)
*H04L 9/00* (2022.01)
*H04L 9/06* (2006.01)

(52) U.S. Cl.
CPC .......... *H04L 9/0861* (2013.01); *H04L 9/0643* (2013.01); *H04L 9/0825* (2013.01); *H04L 9/50* (2022.05)

(58) Field of Classification Search
CPC ... H04L 9/0861; H04L 9/0643; H04L 9/0825; H04L 9/50
See application file for complete search history.

(56) References Cited

U.S. PATENT DOCUMENTS

| | | | |
|---|---|---|---|
| 2014/0226820 A1* | 8/2014 | Chopra | H04L 9/0825 380/277 |
| 2017/0075941 A1 | 3/2017 | Finlow-Bates | |
| 2017/0177898 A1* | 6/2017 | Dillenberger | G06F 21/6227 |
| 2017/0338963 A1 | 11/2017 | Berg | |
| 2019/0207759 A1* | 7/2019 | Chan | H04L 9/0861 |
| 2022/0263943 A1* | 8/2022 | Shinohara | H04M 3/42297 |

FOREIGN PATENT DOCUMENTS

| | | | |
|---|---|---|---|
| CN | 109479164 A | * 3/2019 | H04L 51/10 |
| KR | 102307574 B1 | * 11/2019 | |
| WO | WO2019227225 A1 | 12/2019 | |

OTHER PUBLICATIONS

Agouaillard, "Secure Frames (SFrames): end-to-end media encryption with #webrtc now in chrome," retrieved from <<https://webrtcbydralex.com/index.php/2020/03/30/secure-frames-sframes-end-to-end-media-encryption-with-webrtc-now-in-chrome/>>, WebRTC by Dr Alex, Mar. 30, 2020, 18 pages.

* cited by examiner

*Primary Examiner* — Mohammed Waliullah
(74) *Attorney, Agent, or Firm* — Lee & Hayes, P.C.

(57) ABSTRACT

This disclosure describes techniques for exchanging keys associated with encrypted media sessions using blockchains. In an example method, one or more encrypted frames are generated by encrypting one or more media frames based on an encryption key. Data indicating a ledger in a blockchain is transmitted to one or more computing devices. The ledger includes a decryption key configured to decrypt the one or more encrypted frames. Data packets are generated by packetizing the one or more encrypted frames. The data packets are transmitted to the one or more computing devices.

20 Claims, 7 Drawing Sheets

KEY SHARING FOR MEDIA FRAMES USING BLOCKCHAIN

TECHNICAL FIELD

The present disclosure relates generally to key exchange using blockchain. In particular cases, keys are used for encryption of media frames.

BACKGROUND

Secure Frame (SFrame) is specified in an Internet-Draft with the Internet Engineering Task Force (IETF) and provides techniques for end-to-end encryption and authentication for media frames shared by multiple parties in a conference call. For instance, SFrame specifies that a first party may encrypt media frames. Once the media frames are encrypted, the first party may packetize the encrypted media frames and transmit the packets to a second party in the conference call. The second party may receive the packets and derive the encrypted media frames by depacketizing the packets. The second party may use a decryption key to decode the original media frames.

SFrame specifies a mechanism for key sharing. For example, a messaging server may establish an end-to-end encryption channel between the first party and the second party. In some cases, the second party shares a secret key with the first party via the messaging server. The messaging server may be a third-party device that is not an endpoint within the conference call. The first party can encrypt the media frames based on the secret key.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
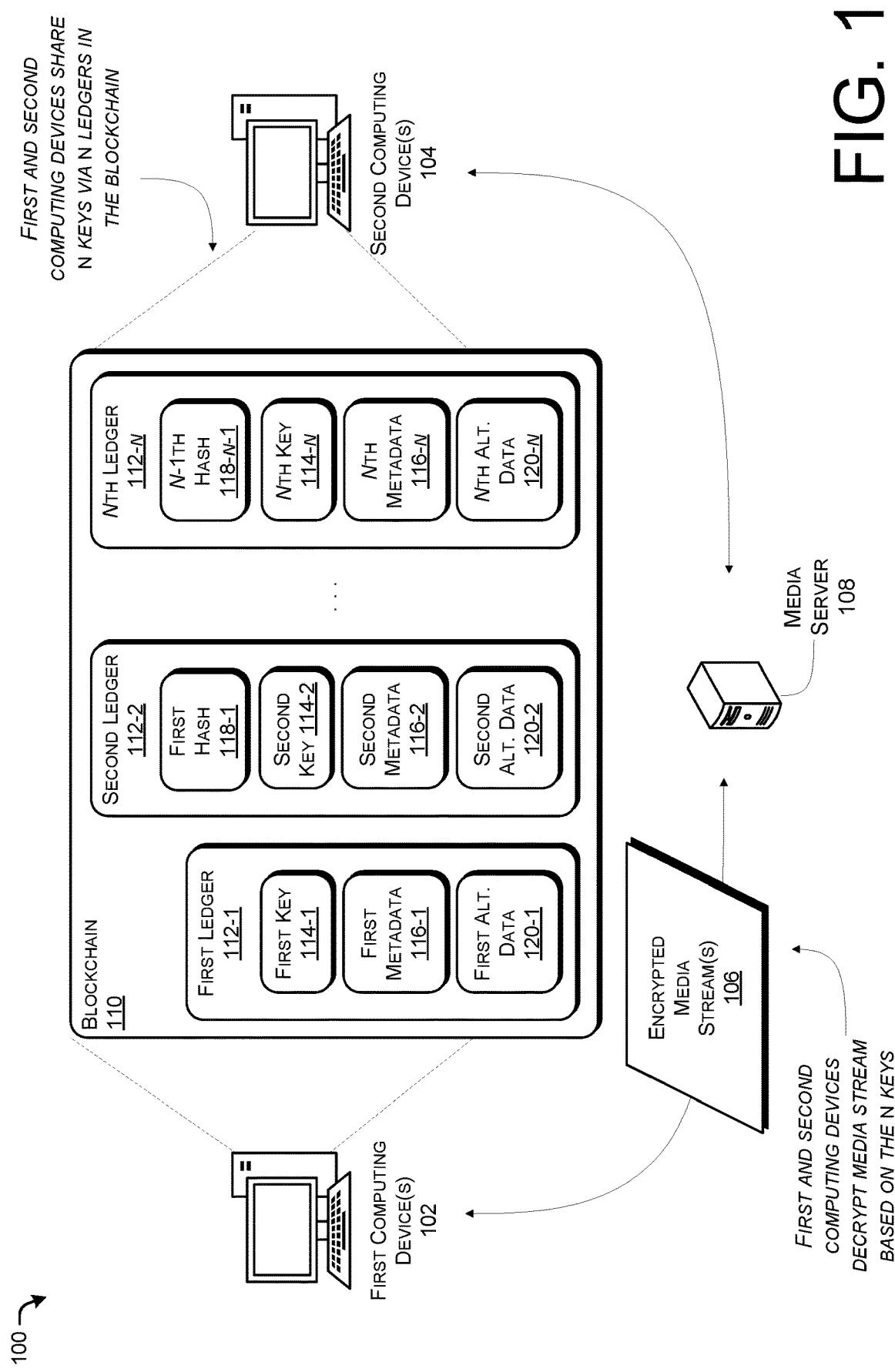
FIG. 1 illustrates an example environment for transmitting and receiving encrypted media in a conference call and for blockchain-based key exchange

This disclosure describes various systems, methods, and devices for blockchain-based key exchange. An example method includes generating one or more encrypted frames by encrypting one or more media frames based on an encryption key; transmitting, to one or more computing devices, data indicating a ledger in a blockchain, the ledger including a decryption key configured to decrypt the one or more encrypted frames; generating data packets by packetizing the one or more encrypted frames; and transmitting, to the one or more computing devices via a media server, the data packets.

In some examples, the method includes generating, by an input device, media data including at least one of image data, video data, or audio data; and generating the one or more media frames based on the media data.

In some implementations, the method includes receiving, from an external device, media data including at least one of image data, video data, or audio data; and generating the one or more media frames based on the media data.

In various examples, the ledger further includes metadata identifying at least one of the one or more computing devices, at least one device performing the method, a session comprising the data packets, or the data packets. According to some examples, the ledger is a subsequent ledger and further comprises a hash of a previous ledger in the blockchain.

In some cases, the method further includes joining the blockchain with the one or more computing devices.

According to some examples, the one or more media frames are one or more first media frames, the one or more encrypted frames are one or more first encrypted frames, the data are first data, the ledger are a first ledger, the decryption key is a first decryption key, and the data packets are first data packets. The example method may further include receiving, from the one or more computing devices, second data indicating a second ledger in the blockchain, the second ledger including a second decryption key and a hash of the first ledger; receiving, from the one or more computing devices via the media server, second data packets; generating one or more second encrypted media frames based on the second data packets; and generating one or more second media frames by decrypting the one or more second encrypted media frames using the decryption key.

In some implementations, the one or more media frames are one or more first media frames, the encryption key is a first encryption key, the one or more encrypted frames are one or more first encrypted frames, the data are first data, the ledger is a first ledger, the decryption key is a first decryption key, and the data packets are first data packets. According to some examples, the method further includes: generating one or more second encrypted frames by encrypting one or more second media frames based on a second encryption key; determining that greater than a threshold number of the first data packets have been transmitted or that greater than a threshold time has passed since the first data was transmitted; based on determining that greater than the threshold number of the first data packets have been transmitted or that greater than the threshold time has passed since the first data was transmitted, transmitting, to the one or more computing devices, second data indicating a second ledger in a blockchain, the ledger including a second decryption key configured to decrypt the one or more second encrypted frames and comprising a hash of the first ledger; generating second data packets by packetizing the one or more second encrypted frames; and transmitting, to the one or more computing devices via the media server, the data packets.

Example Embodiments

This disclosure describes various techniques for key exchange using blockchains. In particular cases, this disclosure describes techniques for exchanging keys that can be used to encrypt and/or decrypt media frames transmitted via SFrame without utilizing an intermediary messaging server.

SFrame provides that a messaging server is used to exchange keys between endpoints. In particular, the messaging server and the endpoints exchange keys using Multi-Layer Security (MLS) and/or Public Key Infrastructure (PKI). However, the messaging server has potentially negative security implications. For example, the messaging server creates a vulnerability by potentially allowing a malicious actor to obtain the keys being exchanged. It may be possible for the malicious actor to run a man-in-the-middle attack that allows the malicious actor to decrypt private media data transmitted between the endpoints. In addition, a man-in-the-middle attack could be used to intercept data traffic between the endpoints.

In various implementations described herein, keys used in SFrame encryption can be exchanged directly and securely between endpoints using a blockchain, rather than a third-party messaging server or other PKI-based infrastructure. First and second endpoints may participate in a blockchain. The first endpoint may add a ledger to the blockchain corresponding to a key. Because the second endpoint is also participating in the blockchain, the key is shared with the second endpoint. Accordingly, the key can be used by the second endpoint to encrypt and/or decrypt data transmitted between the first endpoint and the second endpoint, such as data transferred via a media server. In some examples, the blockchain may be a public blockchain, a private blockchain, or a hybrid blockchain.

Particular techniques described herein utilize two types of encryption per session. The first type of encryption may be referred to as data plane encryption, and may include encrypted media data transmitted between endpoints. The second type of encryption may be referred to as control plane encryption, and may be provided by the blockchain for encrypting the exchanged keys. Thus, both the media data and the keys may be transmitted between endpoints in encrypted forms.

Various examples described herein provide a number of improvements over SFrame and other techniques for transmitting media frames between endpoints. In particular implementations, media data can be transferred between endpoints in ciphertext without utilizing a third-party messaging server, or any other third-party entity, for key exchange. Instead, keys may be shared between the endpoints via a blockchain. Because the messaging server is not required, various implementations described herein are less vulnerable to man-in-the-middle attacks than traditional SFrame environments.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for transmitting and receiving encrypted media in a conference call and for exchanging encryption keys using a blockchain-based technique. In particular cases, the environment 100 includes one or more first computing devices 102 and one or more second computing devices 104. In various examples, the first computing device(s) 102 and the second computing device(s) 104 may be mobile phones, tablet computers, personal computers, laptops, edge devices, smart televisions, servers, certain Internet of Things (IoT) devices, or any combination thereof. The first computing device(s) 102 and the second computing device(s) 104 may be endpoints in a session. As used herein, the terms "session," "communication session," and their equivalents, may refer to a transfer of data between devices, wherein the data is indicative of a conversation or other communication between users of the devices. A session may include one or more unidirectional and/or multidirectional data flows.

As part of the session, the first computing device(s) 102 and the second computing device(s) 104 may exchange one or more encrypted media streams 106 via a media server 108. The encrypted media stream(s) 106 may include multiple data packets that are transmitted between the first computing device(s) 102 and the second computing device(s) 104. As used herein, the terms "data packet," "packet," and their equivalents, may refer to a unit of data carried by one or more communications networks. A data packet may be a protocol data unit in Layer 3 of the Open Systems Interconnection (OSI) model. According to some examples, a data packet may include a header and a payload. Examples of data packets include Internet Protocol (IP) data packets, Real-time Transport Protocol (RTP) packets, and the like. In some examples, the encrypted media stream(s) 106 may include one or more media frames. As used herein, the terms "frame," "media frame," and their equivalents, may refer to a unit of data that includes media data, wherein the frame may include a larger unit of data than a data packet. The data in a single frame may be split into multiple data packets in the encrypted media stream(s) 106.

The media frame(s) in the encrypted media stream(s) 106 may include at least one type of media data. For example, the media frame(s) may include audio data, image data, video data, or a combination thereof. In some examples, the encrypted media stream(s) 106 include a video conference, wherein users of the first computing device(s) 102 and the second computing device(s) 104 are communicating via video and audio data transmitted over the encrypted media stream(s). The encrypted media stream(s) 106 may carry media data in an encrypted format. As used herein, the term "encrypt," and its equivalents, refers to a process of translating data from one format (e.g., an unencoded format) into an encoded format. In various cases, the encoded format is referred to as "ciphertext." Unencoded data, which has not been encrypted, may be referred to as being in "plaintext."

In some implementations, the first computing device(s) 102 and/or the second computing device(s) 104 generate the media data that is encrypted and packetized into the encrypted media stream(s) 106. For example, the first computing device(s) 102 and/or the second computing device(s) 104 may include at least one camera configured to capture one or more images, at least one video camera configured to capture video, at least one microphone configured to detect audio, or the like. In particular implementations, the first computing device(s) 102 and/or the second computing device(s) 104 are connected to one or more external devices configured to generate the media data. In some cases, the first computing device(s) 102 may be connected to one or more external devices (e.g., Internet of Things (IoT) devices) that are configured to generate the media data. For example, the external device(s) may include at least one camera configured to capture one or more images, at least one video camera configured to capture video, at least one microphone configured to detect audio, or the like. In some cases, the first computing device(s) 102 include one or more edge devices in a cloud-based network and/or a Secure Access Service Edge (SASE)-based architecture configured to communicate with the external device(s).

In various examples, the encrypted media stream(s) 106 are encrypted using one or more encryption keys. According to some implementations, the encrypted media stream(s) 106 are encrypted at the frame level. For example, the encrypted media stream(s) 106 may include one media frame transmitted from the first computing device(s) 102 to the second computing device(s) 104. The first computing device(s) 102 may encrypt the media frame in accordance with an encryption key and split the encrypted media frame into multiple packets that are transmitted via the encrypted media stream(s) 106. The packets, for example, may be RTP packets. By encrypting at the frame level, rather than the packet level, the encryption overhead of the encrypted media stream(s) 106 may be reduced. In some implementations, the encrypted media stream(s) 106 include SFrame data packets. Because the encrypted media stream(s) are encrypted, the media server 108 may not have access to the underlying media data in a plaintext format. Accordingly, even if the media server 108 is compromised, the media data being shared between the first computing device(s) 102 and the second computing device(s) 104 is not exposed.

In various cases, the data packets within the encrypted media stream(s) 106 include headers that are discernible to the media server 108. For instance, data packets transmitted from the first computing device(s) 102 may specify one or more device identifiers of the second computing device(s) 104. As used herein, the term "device identifier," and its equivalent, may refer to one or more numbers and/or symbols that are uniquely attributed to a particular device. Examples of device identifiers include addresses (e.g., IP addresses, Media Access Control (MAC) addresses, etc.), identification numbers, and the like. The media server 108 may identify the device identifier(s) and use the device identifier(s) to appropriately route the data packets to the second computing device(s) 104 within the environment 100.

Key exchange is performed in order to enable the first computing device(s) 102 and/or the second computing device(s) 104 to decrypt the encrypted media stream(s) 106. In an SFrame environment, keys would be exchanged using an intermediary messaging server between the first computing device(s) 102 and the second computing device(s) 104. In particular, the keys would be exchanged via Multi-Level Security (MLS).

However, in various implementations described herein, the first computing device(s) 102 and the second computing device(s) 104 may exchange keys without an intermediary messaging server. Instead, the first computing device(s) 102 and the second computing device(s) 104 may exchange keys via a blockchain 110. As used herein, the terms "blockchain," "block chain," and their equivalents, may refer a collection of one or more ledgers distributed over multiple devices. A blockchain can be stored and/or maintained by the multiple devices, such that the blockchain may be accurately maintained in a distributed fashion. As used herein, the terms "ledger," "block," and their equivalents may refer to an individual record within a blockchain. In some examples, a blockchain includes multiple ledgers connected via a hash chain and/or a hash tree. A ledger may include the result of a hash function of another ledger within the blockchain. In addition, the ledger may include additional data.

According to some cases, the first computing device(s) 102 and the second computing device(s) 104 may participate in the blockchain 110. The first computing device(s) 102 and the second computing device(s) 104 may join the environment of the blockchain 110. The first computing device(s) 102 and the second computing device(s) 104 may store data indicative of the blockchain 110. In some examples, the first computing device(s) 102 may modify the blockchain 110 and transmit data indicative of the modified blockchain 110 to the second computing device(s) 104 or vice versa. Any data indicative of a blockchain and/or a modification to a blockchain may be referred to herein as "blockchain data." In various implementations, the blockchain data is transferred between the first computing device(s) 102 and the second computing device(s) 104 in an encrypted format.

As shown in FIG. 1, the blockchain 110 may include first to nth ledgers 112-1 to 112-*n*, wherein n is a positive integer. The first to nth ledgers 112-1 to 112-*n* may respectively include first to nth keys 114-1 to 114-*n*. In some examples, each of the first to nth keys 114-1 to 114-*n* includes 32 bytes. Each participant in the session may generate one of the first to nth keys 114-1 to 114-*n*. For example, one of the first device(s) 102 may generate the first key 114-1, one of the second device(s) 104 may generate the second key 114-2, and so on.

An individual key among the first to nth keys 114-1 to 114-*n* (e.g., each key among the first to nth keys 114-1 to 114-*n*) may be used to derive one or more sub-keys. For example, a sub-key may be derived by performing a hash-based key derivation function (HKDF) or some other type of key derivation function (KDF). For example, a device among the first computing device(s) 102 or the second computing device(s) 104 may derive a salt key, an encryption key, an authentication key, or a combination thereof, from the individual key among the first to nth keys 114-1 to 114-*n*. The salt key may be used to calculate an initialization vector (IV). The encryption key may be used to encrypt a media frame. The authentication key may be used to authenticate the encrypted media frame and/or to authenticate metadata associated with the encrypted media frame. For instance, in some examples, metadata is included in the encrypted media stream(s) 106. By deriving the sub-keys, the device among the first computing device(s) 102 or the second computing device(s) 104 may be able to transmit encrypted media frames within the encrypted media stream(s) 106 in a way that will be understandable by at least one receiving device and/or to decrypt encrypted media frames within the encrypted media stream(s) 106 from at least one sending device. In some examples, the first to nth keys 114-1 to 114-*n* are different keys.

In various examples, the first to nth ledgers 112-1 to 112-*n* may respectively include first to nth metadata 116-1 to 116-*n*. The first to nth metadata 116-1 to 116-*n* may be respectively associated with the first to nth keys 114-1 to 114-*n*. The first to nth metadata 116-1 to 116-*n* may indicate the session, the first computing device(s) 102, the second computing device(s) 104, the encrypted media stream(s) 106, tenant information (e.g., a cloud-hosted tenant operating on the first computing device(s) 102 and/or the second computing device(s) 104, wherein the tenant transmits and/or receives the encrypted media stream(s) 106), capabilities of the first computing device(s) 102 and/or the second computing device(s) 104, source and/or destination information, at least one size of the first to nth keys 114-1 to 114-*n*, at least one time-to-live of the first to nth keys 114-1 to 114-*n*, or a combination thereof. In some cases, the first to nth metadata 116-1 to 116-*n* may include identifiers of one or more of the first computing device(s) 102 and/or the second computing device(s) 104 transmitting data packets whose frames can be decrypted using the first to nth keys 114-1 to 114-*n*. For example, if the first key 114-1 is configured to decrypt data packets in the encrypted media stream(s) 106 transmitted from the first computing device(s) 102, the first metadata 116-1 may include at least one of a device identifier (e.g., an IP address) or a Domain Name Service (DNS) name associated with the first computing device(s) 102. In some examples, the first to nth metadata 116-1 to 116-n may include identifiers of one or more of the first computing device(s) 102 and/or the second computing device(s) 104 receiving data packets whose frames can be decrypted using the first to nth keys 114-1 to 114-n. For example, if the second computing device(s) 104 receive data packets in the encrypted media stream(s) 106 that can be decrypted using the first key 114-1, the first metadata 116-1 may include at least one of a device identifier or a DNS name associated with the second computing device(s) 104. In some implementations, the session associated with the encrypted media stream(s) 106 is associated with an identifier, such as a session identifier (or session ID). In some cases, the first to nth metadata 116-1 to 116-n may include the session identifier. In various implementations, the first to nth metadata 116-1 to 116-n is transmitted via the blockchain 110, rather than the encrypted media stream(s) 106.

The first to nth ledgers 112-1 to 112-n may be related in a hash chain. For example, the second to nth ledgers 112-2 to 112-n may respectively include first to n-1th hashes 118-1 to 118-n-1. Because the first ledger 112-1 is the initial ledger within the blockchain 110, the first ledger 112-1 may omit a hash of another ledger in the blockchain 110.

In some examples, the first to nth ledgers 112-1 to 112-n include first to nth alternative data 120-1 to 120-n. The first to nth alternative data 120-1 to 120-n may include additional data shared between the first computing device(s) 102 and the second device(s) 104. The first to nth alternative data 120-1 to 120-n may be related to the session. For example, the first to nth alternative data 120-1 to 120-n can include text data, Short Message Service (SMS) data, electronic mail, static files (e.g., word processor files, digital presentation files, movie files, digital images, etc.), or the like. Accordingly, the blockchain 110 may serve as an additional, secure channel for the transfer of data between the first computing device(s) 102 and the second computing device(s) 104.

In various implementations, the first computing device(s) 102 and/or the second computing device(s) 104 may add ledgers to the blockchain 110 based on one or more triggering events. In some cases, a ledger (e.g., the nth ledger 112-n) may be added based on an endpoint being added or removed from the session. For instance, a first computing device may be added or removed from the first computing device(s) 102, a second computing device may be added or removed from the second computing device(s) 104, or a combination thereof. In some implementations, a ledger may be added for each direction of the data packets within the encrypted media stream(s) 106. For instance, the first key 114-1 in the first ledger 112-1 may be associated with data packets transmitted in a first direction from the first computing device(s) 102 to the second computing device(s) 104. The second key 114-2 in the second ledger 112-2 may be associated with data packets transmitted in a second direction from the second computing device(s) 104 to the first computing device(s) 102.

In various implementations, a ledger may be added to the blockchain 110 each time a key is rotated within the session. In some cases, key rotation may be performed periodically during the session. For instance, the first computing device(s) 102 and/or the second computing device(s) 104 may generate a new key (and a new ledger in the blockchain 110) every second, every 10 seconds, every minute, every 10 minutes, every 30 minutes, every hour, every 12 hours, every day, or the like. In some cases, key rotation may be performed when a threshold number of data packets has been transferred in the encrypted media stream(s) 106. For example, the first computing device(s) and/or the second computing device(s) 104 may generate a new key (and a new ledger in the blockchain 110) for every data packet that is transferred, every 10 data packets transferred, every 100 data packets transferred, every 1,000 data packets that are transferred, or the like.

Although not illustrated specifically in FIG. 1, various devices within the environment 100 are configured to communicate over one or more communication networks. For example, the first computing device(s) 102 and the second computing device(s) 104 are configured to exchange blockchain data associated with the blockchain 110 over at least one first communication network, the first computing device(s) 102 and the media server 108 are configured to exchange data in the encrypted media stream(s) 106 over at least one second communication network, the second computing device(s) 104 and the media server 108 are configured to exchange data in the encrypted media stream(s) 106 over at least one third communication network, and so on. In some examples, at least two of the first communication network(s), the second communication network(s), and the third communication network(s) may share at least one communication network. As used herein, the term "communication network," and its equivalents, may refer to one or more communications interfaces configured to transfer data between devices. Examples of wired communication networks include optical fiber networks and Ethernet networks. Examples of wireless communication networks include BLUETOOTH networks, WI-FI networks, Citizens Broadcast Radio Service (CBRS) networks, cellular networks, satellite networks, and the like. For example, a cellular network may include a $3^{rd}$ Generation Partnership Project (3GPP) Radio Access Network (RAN) (e.g., a $3^{rd}$ Generation (3G) RAN, a Long Term Evolution (LTE) RAN, a New Radio (NR) RAN) and/or core networks (e.g., a 3G core network, an Evolved Packet Core (EPC), a 5G Core (5GC), an IP Multimedia Subsystem (IMS) network, etc.). In some examples, a communication network may include Local Area Network (LAN), a Wide Area Network (WAN) (e.g., the Internet), or the like.

In various implementations, the environment 100 illustrated in FIG. 1 may be used to securely exchange keys for encrypted media frames. The keys may be exchanged via the blockchain 110, such that the keys need not be exchanged via an intermediary messaging server or MLS-based communications. The blockchain 110 may assure trust between endpoints without relying on a third-party messaging server.

Furthermore, in the environment 100 illustrated in FIG. 1, metadata associated with the session can be exchanged via the blockchain 110, rather than as part of the encrypted media stream(s) 106. The blockchain 110 provides a secure channel through which the metadata 116-1 to 116-n and other alternative data 120-1 to 120-n can be exchanged to enable additional functionality by the first computing device(s) 102 and second computing device(s) 104. Furthermore, the metadata 116-1 to 116-n and alternative data 120-1 to 120-n can be exchanged without being packaged with the data packets carrying the media data in the encrypted media stream(s) 106.

Figure 2:
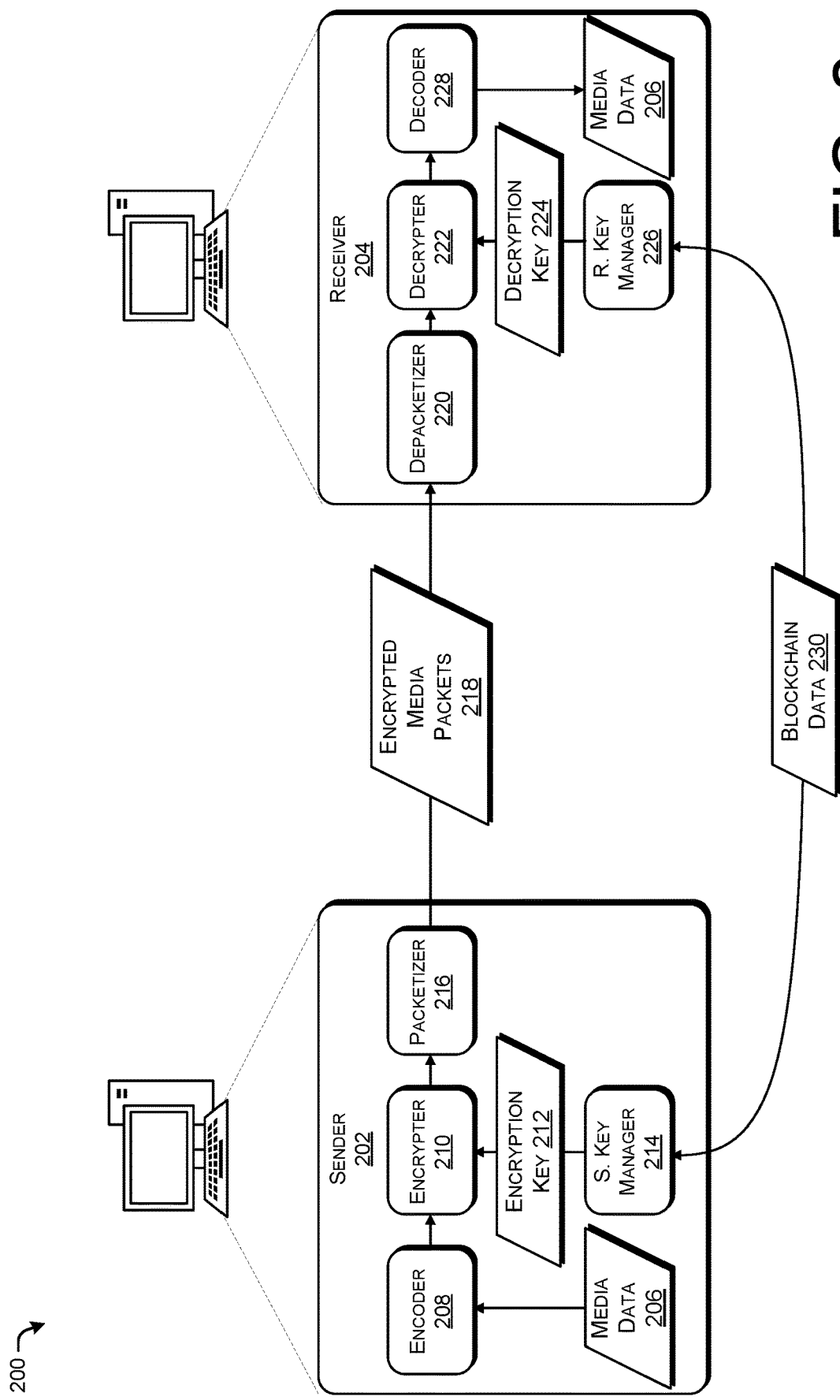
FIG. 2 illustrates an example environment for exchanging media frames in a conference call with blockchain-based key exchange.

FIG. 2 illustrates an example environment 200 for exchanging media frames in a conference call with blockchain-based key exchange. For ease of explanation, the environment 200 includes a single sender 202 and a single receiver 204, however, implementations of the present disclosure are not so limited. The sender 202, for example, may be included in the first computing device(s) 102 described above with reference to FIG. 1. In some instances, the receiver 204 may be included in the second computing device(s) 104 described above with reference to FIG. 1.

In various implementations, the sender 202 may be configured to transmit media data 206 to the receiver 204 in an encrypted fashion. The media data 202 may include image data, video data, audio data (e.g., voice data), collaboration data, or a combination thereof. In some cases, the sender 202 may receive the media data 206 from an external device (e.g., an external IoT device) or may generate the media data 206. The receiver 204 may be able to recover the media data 206. In some cases, the receiver 204 may play back or otherwise output the media data 206. In some examples, the receiver 204 may transmit the media data 206 to an external device configured to output the media data 206. For instance, the receiver 204 and/or the external device may include one or more screens configured to visually output images and/or video in the media data 206, one or more speakers configured to output sound indicative of audio in the media data 206, or a combination thereof.

According to some cases, the sender 202 may include an encoder 208 configured to convert the media data 206 into one or more media frames. The encoder 208 may be implemented in hardware and/or software. The encoder 208 may convert the media data 206 into a single media frame, or multiple media frames that are arranged consecutively. When multiple media frames are generated, the media frames may be associated with individual identifiers (e.g., counters) that indicate the order of the data within the media frames in the media data 206.

The sender 202 may additionally include an encrypter 210 configures to encrypt the media frame(s). The encrypter 210 may encrypt the media frame(s) using an encryption key 212. The encryption key 212 may be specified by a sender key manager 214 that is within the sender 202. The encrypter 210 and the sender key manager 214 may be implemented in hardware and/or software.

The sender 202 may also include a packetizer 216, which may be implemented in hardware and/or software. The packetizer 216 may be configured to convert the encrypted media frame(s) into multiple encrypted media packets 218. For example, the packetizer 216 may convert the encrypted media frame(s) into RTP packets. In various examples, the packetizer 216 may refrain from adding another layer of encryption. For example, the encrypted media packets 218 may be encrypted at the frame level without being additionally encrypted at the data packet level.

In some examples, the packetizer 216 converts a single media encrypted media frame into multiple encrypted media packets 218. The multiple encrypted media packets 216 can include consecutive portions of the encrypted media frame. In addition, a first packet in the encrypted media packet 216 may include an additional header (e.g., an SFrame header). A last packet in the encrypted media packets 216 can include a tag (e.g., an authentication tag). The additional header and/or the tag may indicate that the encrypted media packets 216 correspond to a single encrypted media frame.

The sender 202 may transmit the encrypted media packets 218 to the receiver 204. In various examples, the receiver 204 includes a depacketizer 220 configured to convert the encrypted media packets 218 into the encrypted media frame(s). The depacketizer 220 may be implemented in hardware and/or software.

A decrypter 222 may use a decryption key 224 to decrypt the encrypted media frame(s). A receiver key manager 226 may provide the decryption key 224 to the decrypter 222. The decrypter 222 and the receiver key manager 226 may be implemented in hardware and/or software. In some cases, the additional header included in the encrypted media packets 218 may indicate the decryption key 224 to be used with the encrypted media frame, which may be one of multiple decryption keys received and/or stored by the receiver key manager 226. In some cases, the decrypter 222 may use the tag to authenticate the encrypted media frame. For example, the receiver key manager 226 may derive an authentication key from the blockchain data 230 that the decrypter 222 may use to authenticate the encrypted media frame.

A decoder 228 may receive the decrypted media frame(s) from the decrypter 222. The decoder 228 may restore the media data 206 based on the decrypted media frame(s). The decoder 228 may be implemented in hardware and/or software. The additional header of the encrypted media packets 218 may indicate an identifier (e.g., a counter) of the encrypted media frame, such that if the sender 202 is transmitting multiple encrypted media frames within the encrypted media packets 218, the decoder 228 may derive (using the identifier) an appropriate order in which the data within the decrypted media frames for restoring the media data 206. In some examples, the identifier of the encrypted media frame is associated with the IV of the encrypted media frame, which may be indicated in the blockchain data 230.

In various implementations, the sender key manager 214 of the sender 202 and the receiver key manager 226 of the receiver 204 may communicate about the encryption key 212 and/or the decryption key 224 based on a blockchain that the sender 202 and the receiver 204 are participating in. In various cases, the sender key manager 214 sends blockchain data 230 to the receiver key manager 226, the receiver key manager 226 sends blockchain data 230 to the sender key manager 214, or a combination thereof. The blockchain data 230 may indicate one or more ledgers of the blockchain that the sender 202 and the receiver 204 are participating in.

In some cases, the blockchain data 230 is transmitted from the receiver key manager 226 to the sender key manager 214. The blockchain data 230 may indicate the encryption key 212. For example, the sender key manager 214 may derive the encryption key 212 based on the blockchain data 230. Because the receiver key manager 226 may determine that the media frame(s) in the encrypted media packets 218 are encrypted in accordance with the encryption key 212, the receiver key manager 226 may select the appropriate decryption key 224 for decrypting the media frame(s). Accordingly, the receiver 204 may be configured to successfully recover the media data 206.

In some implementations, the blockchain data 230 is transmitted from the sender key manager 214 to the receiver key manager 226. The blockchain data 230, for example, may indicate the decryption key 224. The receiver key manager 226 may derive the decryption key 224 based on the blockchain data 230. In various examples, the sender key manager 214 may further provide the encryption key 212 that corresponds to the decryption key 224 to the encrypter 210. Accordingly, the receiver 204 may be configured to successfully recover the media data 206.

In particular implementations, the environment 200 of FIG. 2 can be adopted in an SFrame-like encryption scheme. For example, the sender 202 may generate a secret key to the receiver 204 via the blockchain data 230. The receiver 202 may derive the secret key based on the blockchain data 230.

In addition, the receiver 202 may derive a salt key, the encryption key 212, and the authentication key based on the secret key.

Figure 3:
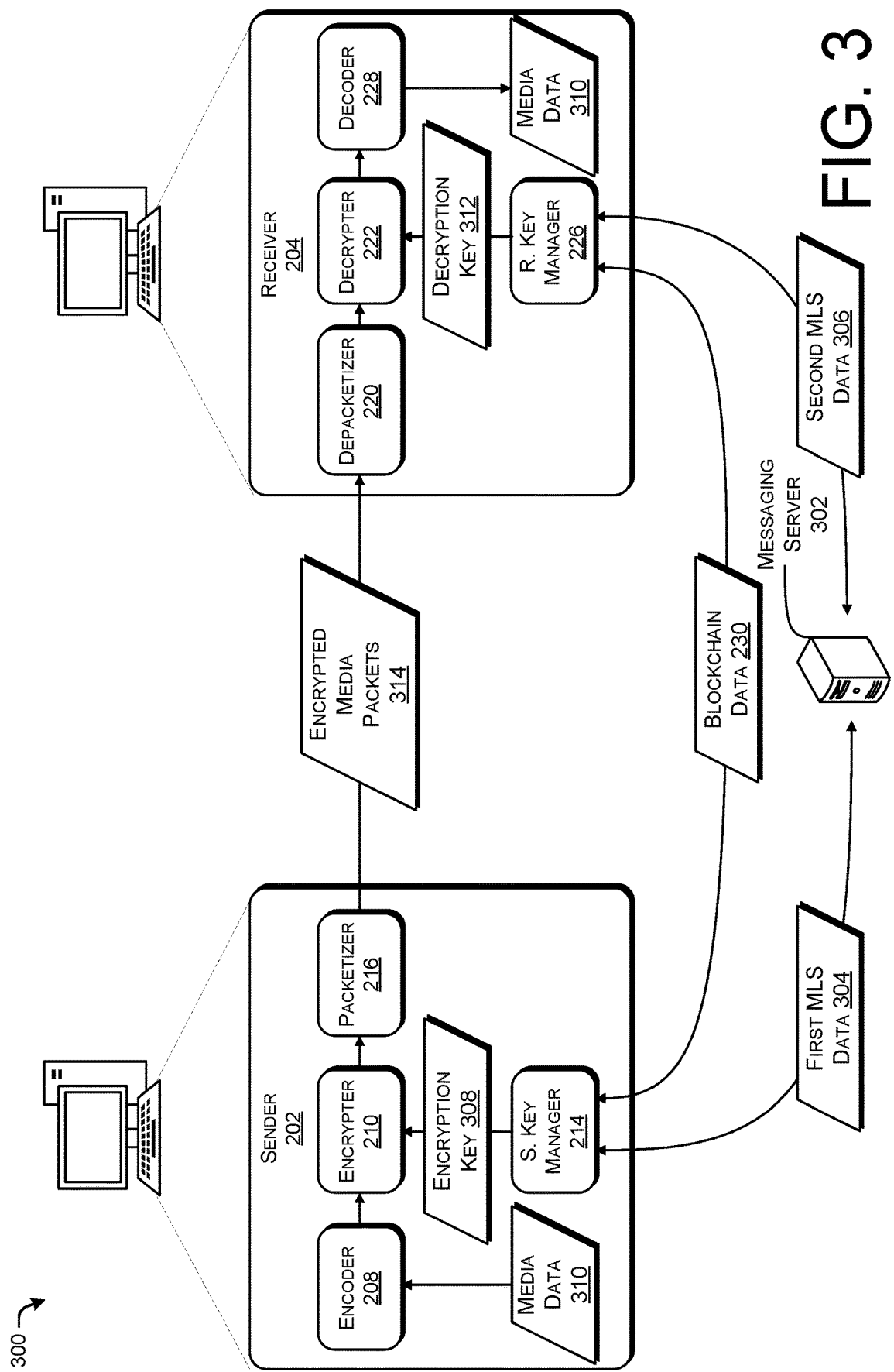
FIG. 3 illustrates an example environment wherein keys are exchanged in a hybrid model.

FIG. 3 illustrates an example environment 300 wherein keys are exchanged in a hybrid model. The example environment 300 may include a messaging server 302. The messaging server 302 may be a third-party computing device configured to exchange keys between the sender 202 and the receiver 204 in some implementations.

Using the example environment 300 illustrated in FIG. 3, the sender 202 and the receiver 204 may exchange keys through one or both of two techniques. The first technique, described with reference to FIG. 2, includes the sender 202 and the receiver 204 participating in a blockchain and using the blockchain to exchange keys. For example, blockchain data 230 may be transmitted between the sender 202 and the receiver 204, and the sender and/or receiver may derive the encryption key 212 and/or the decryption key 224 based on the blockchain data 230.

While the first, blockchain-based technique provides enhanced security to the encrypted media packets 218, the blockchain-based technique may utilize a significant amount of computing resources. As used herein, the terms "computing resource," "compute resources," "resources," and their equivalents, can refer to at least one of processing resources, memory resources, communication resources, cache resources, service resources, or the like, of one or more computing devices. The term "processing resource," and its equivalents, may refer to the availability of at least a portion of one or more physical processors (e.g., a portion of CPUs) within one or more computing devices to process data. The terms "memory resource," "storage resource, and their equivalents, may refer to the availability of at least a portion of one or more physical memory systems (e.g., Random Access Memory (RAM)) within a host to store data. The term "communication resource," and its equivalents, may refer to an amount of bandwidth available for transmitting data over one or more communication networks. The term "cache resource," and its equivalents, can refer to the availability of a capacity in a RAM and/or in-memory engine within a host to cache data at least temporarily. The term "service resource," and its equivalents, may refer to the availability of one or more services hosted by one or more computing devices to perform requested operations.

In some implementations, the sender 202 and the receiver 204 can exchange keys using a second technique. In some cases, the second technique may be consistent with an SFrame key exchange technique. The second technique may be an MLS-based key exchange technique. First MLS data 304 may be transmitted between the sender key manager 214 of the sender 202 and the messaging server 302. In addition, second MLS data 306 may be transmitted between the receiver key manager 226 of the receiver 304 and the messaging server 302. The first MLS data 304 and the second MLS data 306 may be indicative of an encryption key 308 that the encrypter 210 uses to encrypt one or more media frames carrying media data 310, a decryption key 312 that the decrypter 222 uses to decrypt one or more encrypted media frames, or a combination thereof. The sender 202 may transmit encrypted media packets 314 to the receiver 204 based on the encrypted media frame(s). Thus, using the second technique, the sender 202 and the receiver 204 may exchange keys via the messaging server 302.

In some examples, the sender 202 and the receiver 204 perform the first technique or the second technique based on one or more events. For example, the sender 202 and the receiver 204 may switch from the first technique to the second technique based on one or both of the sender 202 or the receiver 204 determining that the first technique has consumed greater than a threshold amount of computing resources. In some cases, the sender 202 and the receiver 204 may switch from the first technique to the second technique based on a user of the sender 202 or the receiver 204 selecting a security policy for the session corresponding to the encrypted media packets 314. In various implementations, the sender 202 and the receiver 204 may be configured to perform the first technique and the second technique with respect to one or more sessions.

Figure 4:
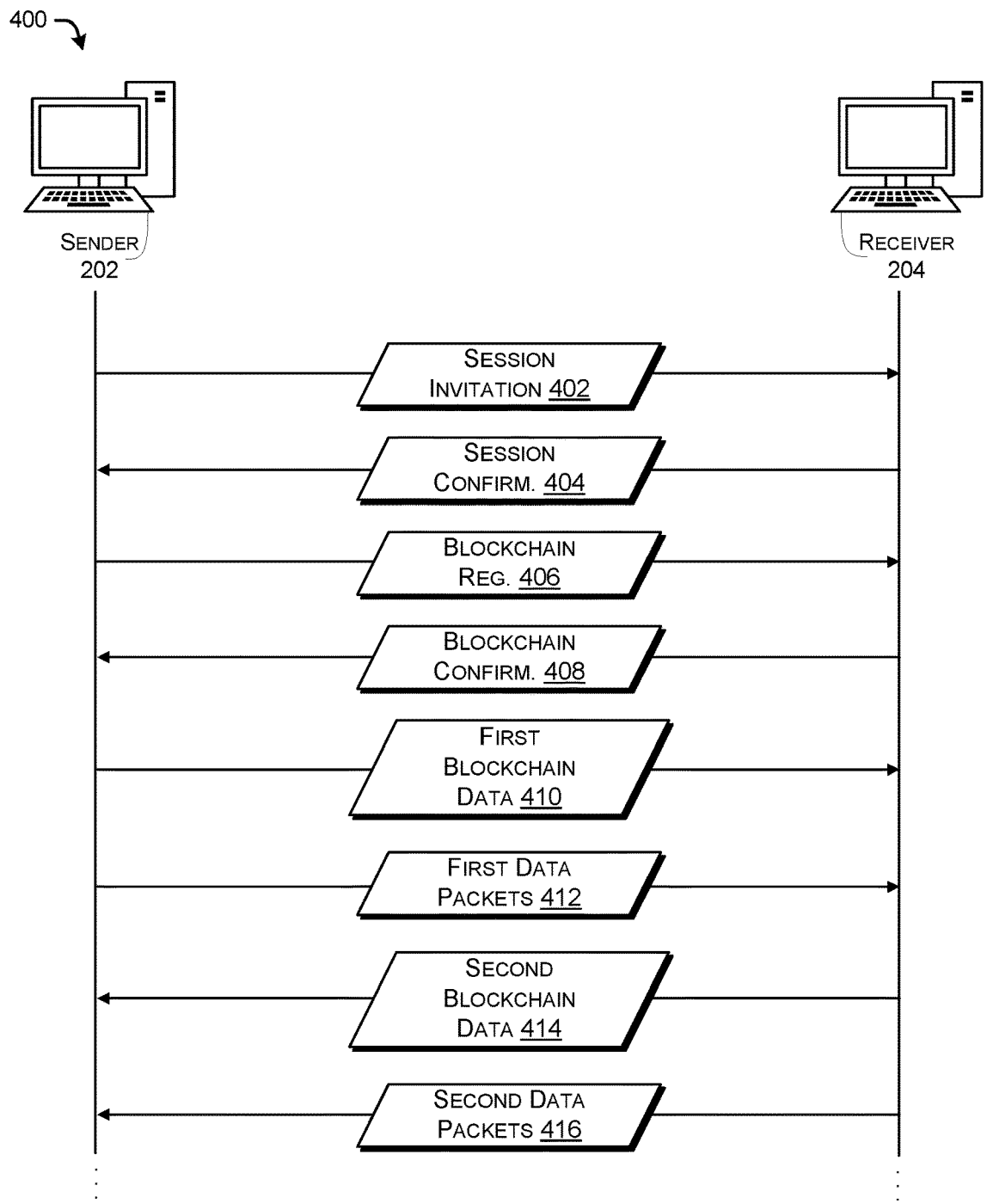
FIG. 4 illustrates example signaling for exchanging multiple keys used in a media session using a blockchain.

FIG. 4 illustrates example signaling 400 for exchanging multiple keys used in a media session using a blockchain. As shown, the signaling 400 is between the sender 202 and the receiver 204 described above with reference to FIGS. 2 and 3. Each transmission illustrated in FIG. 4 may include one or more data packets. In addition, each individual transmission illustrated in FIG. 4 may be transmitted over one or more communication networks.

The sender 202 may transmit a session invitation 402 to the receiver 204. In some cases, the session invitation 402 may include a message transmitted from the sender 202 to a media server, and a message transmitted from the media server to the receiver 204. The session invitation 402 may initiate a session between the sender 202 and the receiver 204. For example, the session invitation 402 may indicate that the sender 202 is calling the receiver 204.

The receiver 204 may transmit a session confirmation 404 to the sender 202. In some implementations, the session confirmation 404 may include a message transmitted from the receiver 204 to the media server and a message transmitted from the media server to the sender 202. The session confirmation 404 may indicate that the receiver 204 has agreed to participate in the session. For example, the session confirmation 404 may indicate that the receiver 204 has accepted the call from the sender 202.

In various implementations, the sender 202 and the receiver 204 may participate in a blockchain. The sender 202 may transmit a blockchain registration 406 to the receiver 204. Unlike the session invitation 402 or the session confirmation 404, the blockchain registration 406 may include one or more messages transmitted directly from the sender 202 to the receiver 204 and may exclude any messages transmitted to the media server.

The receiver 204 may transmit a blockchain confirmation 408 to the sender 202. Similarly to the blockchain registration 406, the blockchain confirmation 408 may include one or more messages transmitted directly from the receiver 204 to the sender 202 without any messages transmitted to the media server.

The sender 202 may transmit first blockchain data 410 to the receiver 204. In various examples, the first blockchain data 410 may be indicative of a first ledger in the blockchain. The first blockchain data 410, for example, may indicate a first decryption key. In some examples, the first blockchain data 410 may also indicate first metadata. For instance, the first blockchain data 410 may indicate an identifier of the sender 202 (e.g., an IP address of the sender 202), an identifier of the session (e.g., a session identifier), an identifier of the receiver 204 (e.g., an IP address of the receiver 204), an identifier of the service and/or cloud that an application used by the sender 202 and/or receiver 204 is hosted on, or any combination thereof. In some cases, the first metadata may indicate what data packets in the session can be decrypted by the first decryption key.

The sender 202 may transmit first data packets 412 to the receiver 204. In various implementations, the sender 202 may generate first media data. For example, the sender 202 may include a microphone configured to generate first audio data based on detecting first audio and may include a camera configured to generate first video data based on detecting images. The sender 202 may generate one or more first media frames based on the first media data. In addition, the sender 202 may encrypt the first media frame(s) using a first encryption key. The sender 202 may generate the first data packets 412 by packetizing the encrypted first media frame(s). The first data packets 412 may include, for example, RTP packets. In various examples, the receiver 204 may convert the first data packets 412 into the encrypted first media frame(s) and decrypt the encrypted first media frame(s) using the first decryption key. In addition, the receiver 204 may derive the first media data based on the decrypted first media frame(s). In some examples, the receiver 204 may output the first media data. For instance, the receiver 204 may include a speaker that outputs sound based on the first audio data and a screen that outputs a video based on the first video data.

The receiver 204 may transmit second blockchain data 414 to the sender 202. In various examples, the second blockchain data 414 may be indicative of a second ledger in the blockchain. The second blockchain data 414, for example, may indicate a second decryption key. In some examples, the second blockchain data 414 may also indicate second metadata. For instance, the second blockchain data 414 may indicate an identifier of the sender 202 (e.g., an IP address of the sender 202), an identifier of the session (e.g., a session identifier), an identifier of the receiver 204 (e.g., an IP address of the receiver 204), or any combination thereof. In some cases, the first metadata may indicate what data packets in the session can be decrypted by the second decryption key.

The receiver 204 may transmit second data packets 416 to the sender 202. For example, the receiver 204 may include a microphone configured to generate second audio data based on detecting second audio and may include a camera configured to generate second video data based on detecting images. The receiver 204 may generate one or more second media frames based on the second media data. The receiver 204 may encrypt the second media frame(s) based on a second encryption key. Further, the receiver 204 may generate the second data packets 416 based on the encrypted first media frame(s). In some cases, the second data packets 416 include RTP packets. In various implementations, the sender 202 may convert the second data packets 416 into the encrypted second media frame(s). Further, the sender 202 may decrypt the encrypted second media frame(s) using the second decryption key. The sender 202 may derive the second media data based on the decrypted second media frame(s). In some examples, the sender 202 may output the second media data. For instance, the sender 202 may include a speaker that outputs sound based on the first audio data and a screen that outputs a video based on the second video data.

Figure 5:
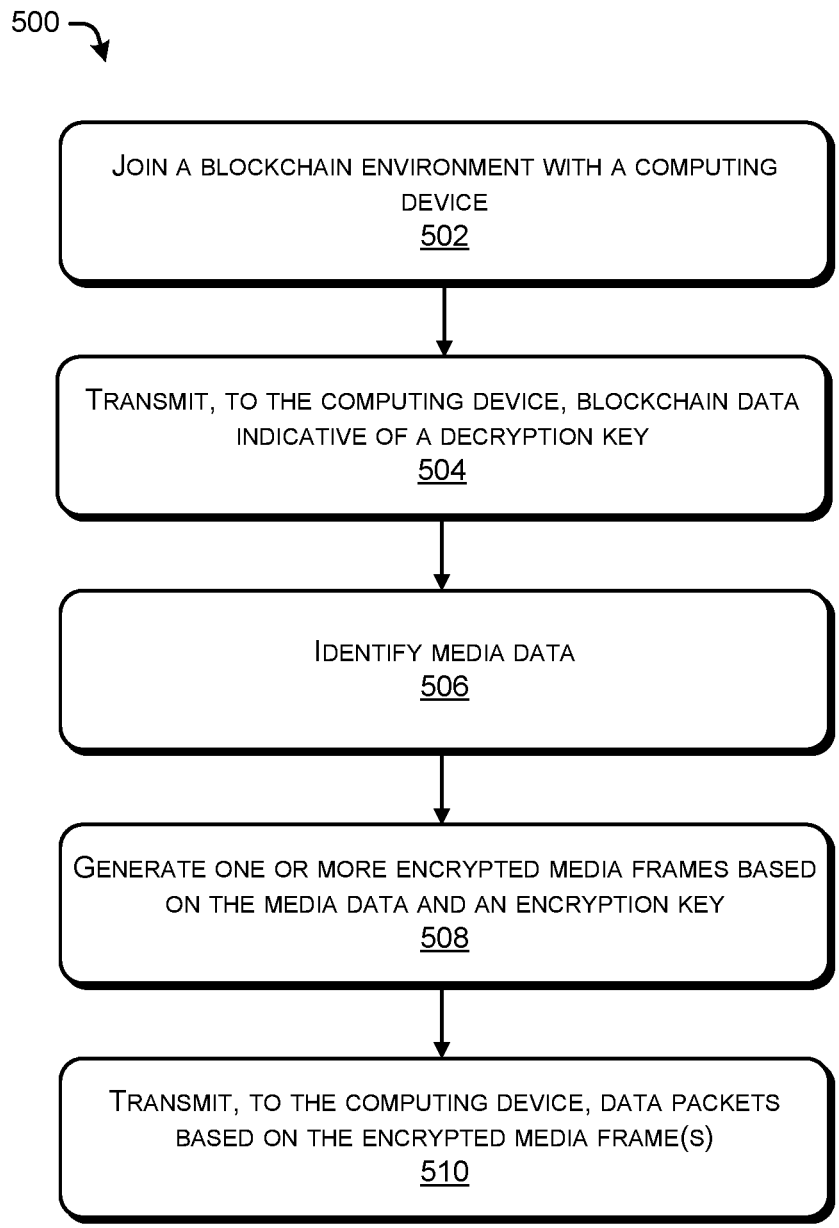
FIG. 5 illustrates a first example process for performing key exchange of a media session using a blockchain-based technique.

FIG. 5 illustrates a first example process 500 for performing key exchange of a media session using a blockchain-based technique. The process 500 may be performed by an entity, such as the first computing device(s) 102, the second computing device(s) 104, the sender 202, the receiver 204, or any combination thereof.

At 502, the entity joins a blockchain environment with a computing device. For example, the entity may exchange one or more messages with the computing device indicating a blockchain. By participating in the blockchain, the entity and the computing device may be configured to store data indicative of the blockchain, add one or more ledgers to the blockchain, transmit and/or receive data indicative of modifications to the blockchain, or a combination thereof.

At 504, the entity transmits, to the computing device, blockchain data indicative of a decryption key. In various examples, the blockchain data may be indicative of a ledger in the blockchain. In some cases, the ledger indicates or otherwise includes the decryption key and metadata. The metadata, for instance, may indicate an identifier of the entity (e.g., an IP address of the entity), an identifier of a media session between the entity and the computing device (e.g., a session identifier), an identifier of the computing device (e.g., an IP address of the computing device), or a combination thereof. In some cases, the metadata specifies data that can be decrypted using the decryption key. In various implementations, the blockchain data is transmitted directly to the computing device, and is not modified or forwarded by an intermediary server (e.g., a messaging server).

At 506, the entity identifies media data. The media data, for example, may include image data indicating one or more images, video data indicating one or more videos, audio data indicating audio, or a combination thereof. In some examples, the entity generates the media data. For example, the entity may include a camera configured to generate the image data by detecting the one or more images, a video camera configured to generate the video data by detecting the one or more videos, a microphone configured to generate the audio data by detecting the audio, or a combination thereof. In some instances, the entity may receive the media data from an external device. For example, the entity may be in communication with the external device and the external device may be configured to generate the media data and send the media data to the entity. In some cases, the external device is an IoT device connected to the entity. In some examples, the entity may receive or otherwise identify a Manufacturer Usage Description (MUD) associated with the external device. The MUD may indicate that the entity is to share the decryption key via a blockchain. For example, the entity may perform 502 based on the MUD of the external device.

At 508, the entity generates one or more encrypted media frames based on the media data and an encryption key. For example, the entity may generate one or more unencrypted media frames based on the media data. The entity may encrypt the media frame(s) using the encryption key. In various examples, the encrypted media frame(s) may be decrypted by the decryption key indicated in the blockchain data.

At 510, the entity transmits, to the computing device, data packets based on the encrypted media frame(s). In various implementations, the entity may generate the data packets by packetizing the encrypted media frame(s). In some cases, the data packets include RTP packets. The entity may transmit the data packets to one or more media servers, which may forward the data packets to the computing device. Because the computing device can derive the decryption key, the computing device may derive the media data based on the data packets. For instance, the computing device may generate the encrypted media frame(s) based on the data packets, decrypt the media frame(s) using the decryption key, and generate the media data based on the decrypted media frame(s). In some examples, the computing device may output the image(s), video(s), audio, or a combination thereof, indicated by the media data.

Figure 6:
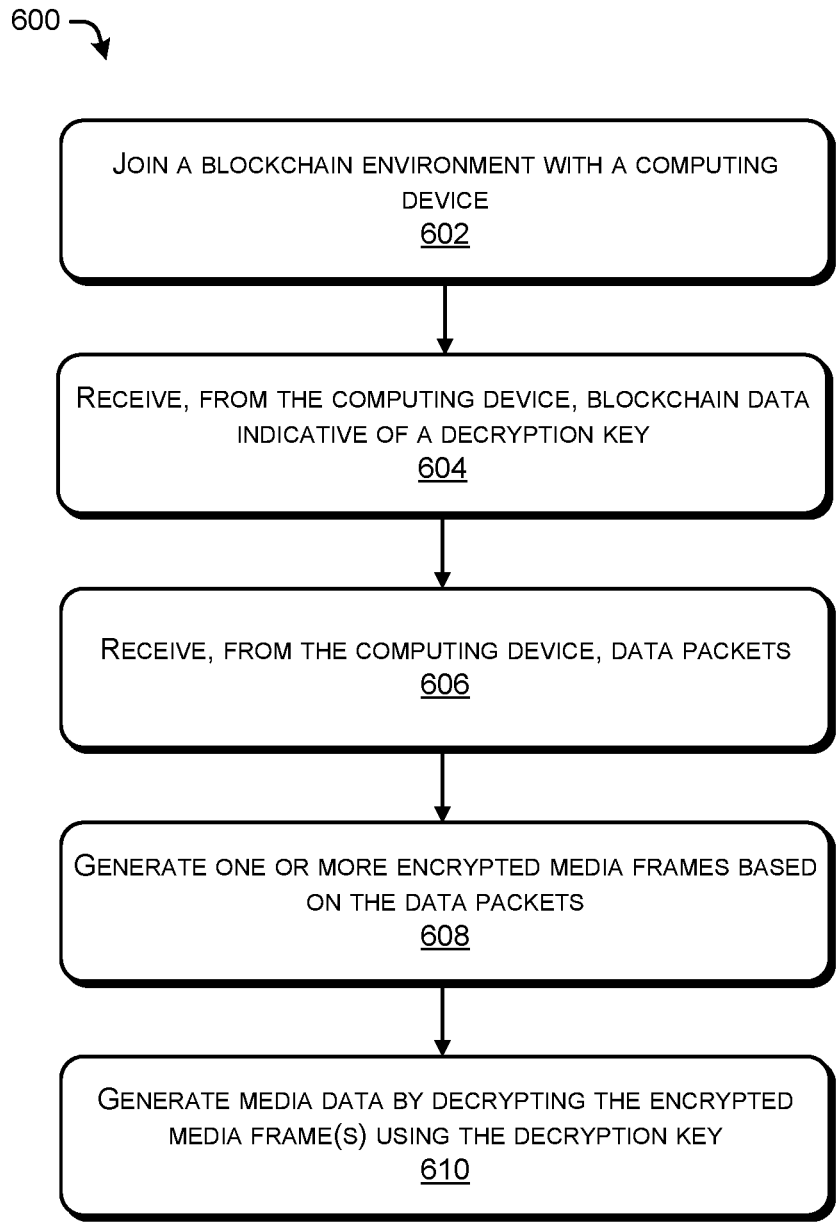
FIG. 6 illustrates a second example process for performing key exchange of a media session using a blockchain-based technique.

FIG. 6 illustrates a second example process 600 for performing key exchange of a media session using a blockchain-based technique. The process 600 may be performed by an entity, such as the first computing device(s) 102, the second computing device(s) 104, the sender 202, the receiver 204, or any combination thereof.

At 602, the entity joins a blockchain environment with a computing device. For example, the entity may exchange one or more messages with the computing device indicating a blockchain. By participating in the blockchain, the entity and the computing device may be configured to store data indicative of the blockchain, add one or more ledgers to the blockchain, transmit and/or receive data indicative of modifications to the blockchain, or a combination thereof.

At 604, the entity receives, from the computing device, blockchain data indicative of a decryption key. In various examples, the blockchain data may be indicative of a ledger in the blockchain. In some cases, the ledger indicates or otherwise includes the decryption key and metadata. The metadata, for instance, may indicate an identifier of the entity (e.g., an IP address of the entity), an identifier of a media session between the entity and the computing device (e.g., a session identifier), an identifier of the computing device (e.g., an IP address of the computing device), or a combination thereof. In some cases, the metadata specifies data that can be decrypted using the decryption key. In various implementations, the blockchain data is transmitted directly to the entity from the computing device and is not modified or forwarded by an intermediary server (e.g., a messaging server). The entity may generate or otherwise derive the decryption key based on the blockchain data.

At 606, the entity receives, from the computing device, data packets. In some cases, the data packets include RTP packets. The entity may receive the data packets from one or more media servers, which may forward the data packets to the entity. At 608, the entity generates one or more encrypted media frames based on the data packets. For example, the entity may generate an encrypted media frame based on multiple data packets among the data packets.

At 610, the entity generates media data by decrypting the encrypted media frame(s) using the decryption key. For instance, the entity may generate the encrypted media frame(s) based on the data packets, decrypt the media frame(s) using the decryption key, and generate the media data based on the decrypted media frame(s). The media data, for example, may include image data indicating one or more images, video data indicating one or more videos, audio data indicating audio, or a combination thereof. In some examples, the computing device may output the image(s), video(s), audio, or a combination thereof, indicated by the media data.

Figure 7:
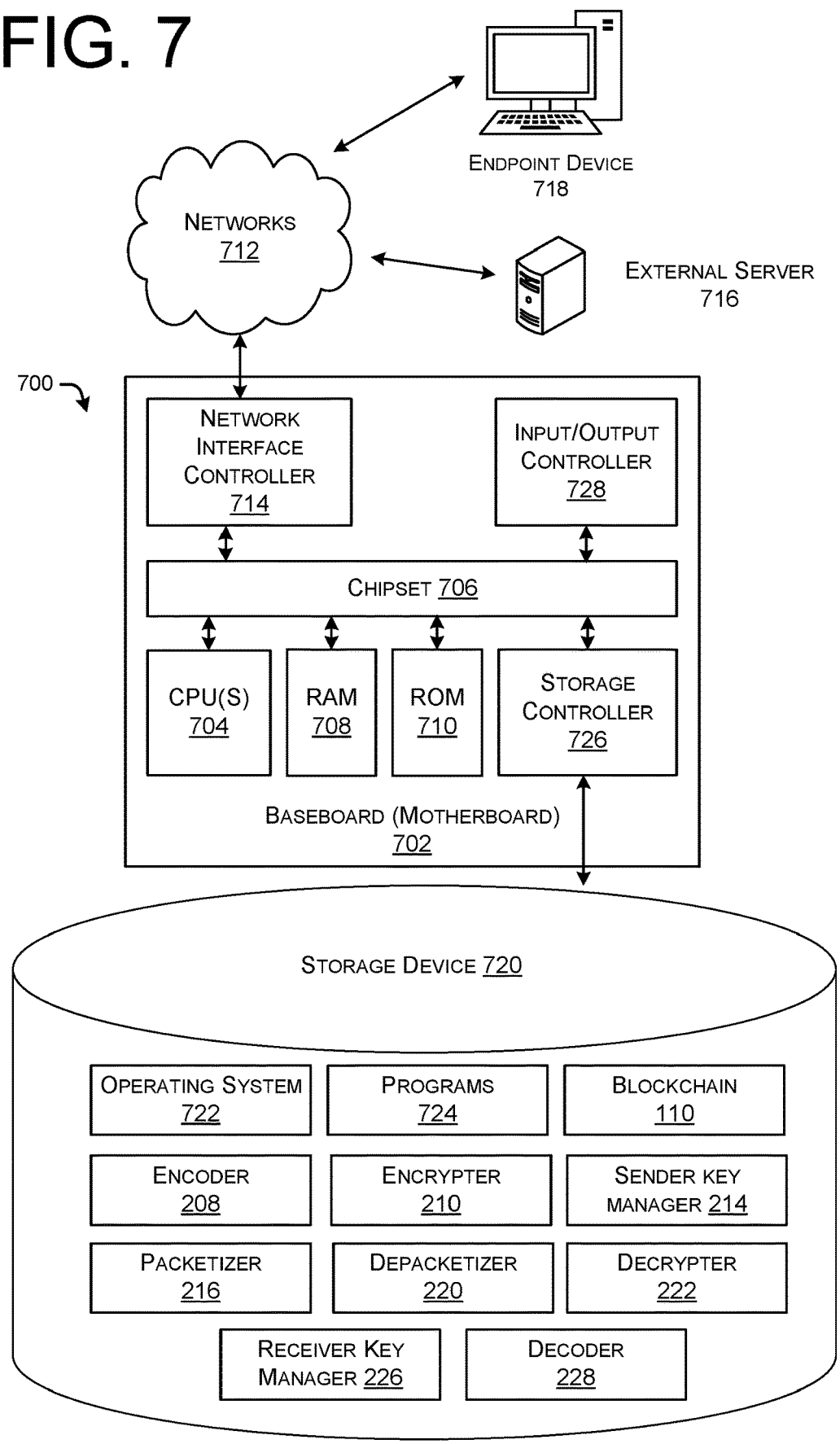
FIG. 7 shows an example computer architecture for a server computer capable of executing program components for implementing the functionality described above.

FIG. 7 shows an example computer architecture for a computer 700 capable of executing program components for implementing the functionality described above. The computer architecture shown in FIG. 7 illustrates a conventional computer, workstation, desktop computer, laptop, tablet, network appliance, e-reader, smartphone, or other computing device, and can be utilized to execute any of the software components presented herein. The computer 700 may, in some examples, correspond to an endpoint device (e.g., one of the first computing device(s) 102, one of the second computing device(s) 104, the sender 202, or the receiver 204).

The computer 700 includes a baseboard 702, or "motherboard," which is a printed circuit board to which a multitude of components or devices can be connected by way of a system bus or other electrical communication paths. In one illustrative configuration, one or more CPUs 704 operate in conjunction with a chipset 706. The CPU(s) 704 can be standard programmable processors that perform arithmetic and logical operations necessary for the operation of the computer 700.

The CPU(s) 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chip set 706 provides an interface between the CPU(s) 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through one or more networks 712. The chipset 706 can include functionality for providing network connectivity through a network interface controller (NIC) 714, such as a gigabit Ethernet adapter. The NIC 714 is capable of connecting the computer 700 to other computing devices over the network 712. It should be appreciated that multiple NICs 714 can be present in the computer 700, connecting the computer 700 to other types of networks and remote computer systems. In some instances, the NICs 714 may include at least on ingress port and/or at least one egress port.

In various examples, the computer 700 is connected to an external server 716 and/or an endpoint device 718 via the network(s) 712. In some examples, the external server 716 is a media server. In some examples, the external server 716 transmits, to the computer 700 over the network(s) 712, installation data that, when stored and executed by the computer 700, causes the computer 700 to perform various functions described herein. In various implementations, the computer 700 and the endpoint device 718 may exchange blockchain data and/or encrypted media data over the network(s) 712.

The computer 700 can be connected to a storage device 720 that provides non-volatile storage for the computer 700. The storage device 720 can store an operating system 722, programs 724, and data, which have been described in greater detail herein. The storage device 720 can be connected to the computer 700 through a storage controller 726 connected to the chipset 706. The storage device 720 can consist of one or more physical storage units. The storage controller 726 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 700 can store data on the storage device 720 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 720 is characterized as primary or secondary storage, and the like.

For example, the computer 700 can store information to the storage device 720 by issuing instructions through the storage controller 726 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 720 by detecting the physical states or characteristics of one or more particular locations within the physical storage units.

In addition to the mass storage device 720 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by any network node described herein may be supported by one or more devices similar to computer 700. Stated otherwise, some or all of the operations performed by a network node may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 720 can store an operating system 722 utilized to control the operation of the computer 700. According to one embodiment, the operating system comprises the LINUX™ operating system. According to another embodiment, the operating system includes the WINDOWS™ SERVER operating system from MICROSOFT Corporation of Redmond, Wash. According to further embodiments, the operating system can comprise the UNIX™ operating system or one of its variants. It should be appreciated that other operating systems can also be utilized. The storage device 720 can store other system or application programs and data utilized by the computer 700.

In one embodiment, the storage device 720 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPU(s) 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

As illustrated in FIG. 7, the storage device 720 stores programs 724, which may include one or more processes, as well as the blockchain 110, encoder 208, encrypter 210, sender key manager 214, packetizer 216, depacketizer 220, decrypter 222, receiver key manager 226, and the decoder 228 described above. The programs 724, the blockchain 110, encoder 208, encrypter 210, sender key manager 214, packetizer 216, depacketizer 220, decrypter 222, receiver key manager 226, and the decoder 228 may include instructions that, when executed by the CPU(s) 704, cause the computer 700 and/or the CPU(s) 704 to perform one or more operations.

The computer 700 can also include one or more input/output controllers 728 for receiving and processing input from a number of input devices, such as a keyboard, a mouse, a touchpad, a touch screen, an electronic stylus, or other type of input device. Similarly, an input/output controller 728 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method, comprising:
generating one or more first encrypted frames by encrypting one or more first media frames based on a first encryption key;
transmitting, to one or more computing devices, first data indicating a first ledger in a blockchain, the first ledger comprising a first decryption key configured to decrypt the one or more first encrypted frames;
generating first data packets by packetizing the one or more first encrypted frames;
transmitting, to the one or more computing devices via a media server, the first data packets;
generating one or more second encrypted frames by encrypting one or more second media frames based on a second encryption key;
determining that greater than a threshold number of the first data packets have been transmitted or that greater than a threshold time has passed since the first data was transmitted;
based on determining that greater than the threshold number of the first data packets have been transmitted or that greater than the threshold time has passed since the first data was transmitted, transmitting, to the one or more computing devices, second data indicating a second ledger in a blockchain, the second ledger comprising a second decryption key configured to decrypt the one or more second encrypted frames and comprising a hash of the first ledger;
generating second data packets by packetizing the one or more second encrypted frames; and
transmitting, to the one or more computing devices via the media server, the second data packets.

2. The method of claim 1, further comprising:
generating, by an input device, media data comprising at least one of image data, video data, or audio data; and
generating the one or more first media frames based on the media data.

3. The method of claim 1, further comprising:
receiving, from an external device, media data comprising at least one of image data, video data, or audio data; and
generating the one or more first media frames based on the media data.

4. The method of claim 1, wherein the first ledger further comprises metadata identifying at least one of the one or more computing devices, a size of the first encryption key, a time-to-live of the first encryption key, a size of the first decryption key, a time-to-live of the first decryption key, a tenant generating the one or more first encrypted frames, a tenant operating on the one or more computing devices, at least one device performing the method, a session comprising the first data packets, or the first data packets.

5. The method of claim 1, wherein the first ledger is a subsequent ledger and further comprises a hash of a previous ledger in the blockchain.

6. The method of claim 1, further comprising:
joining the blockchain with the one or more computing devices.

7. The method of claim 1, further comprising:
receiving, from the one or more computing devices, third data indicating a third ledger in the blockchain, the third ledger comprising a third decryption key and a hash of the second ledger;
receiving, from the one or more computing devices via the media server, third data packets;
generating one or more third encrypted media frames based on the third data packets; and
generating one or more third media frames by decrypting the one or more third encrypted media frames using the third decryption key.

8. The method of claim 1, wherein the first ledger further comprises at least one of text data, Short Message Service (SMS) data, an electronic mail, or a static file.

9. A system, comprising:
at least one processor; and
one or more non-transitory media storing instructions that, when executed by the system, cause the system to perform operations comprising:
receiving, from one or more computing devices via a media server, first data packets;
receiving, from the one or more computing devices, first data indicating a first ledger in a blockchain, the first ledger comprising a first decryption key;
generating one or more first encrypted frames based on the first data packets;
generating one or more first media frames by decrypting the one or more first encrypted frames using the first decryption key;
generating first media data based on the one or more first media frames;
receiving, from the one or more computing devices via the media server, second data packets;
based on greater than a threshold number of the first data packets having been received or greater than a threshold time having passed since the first data packets were received, receiving, from the one or more computing devices, data indicating a second ledger in the blockchain, the second ledger comprising a second decryption key and comprising a hash of the first ledger;
generating one or more second encrypted frames based on the second data packets;
generating one or more second media frames by decrypting the one or more second encrypted frames using the second decryption key; and
generating second media data based on the one or more second media frames.

10. The system of claim 9, further comprising:
an output device configured to output at least one of an image, a video, or audio based on the first media data.

11. The system of claim 9, further comprising:
a transceiver configured to transmit the first media data to an external device.

12. The system of claim 9, wherein the first ledger further comprises metadata identifying at least one of the one or more computing devices, at least one device performing the operations, a session comprising the first data packets, or the first data packets.

13. The system of claim 9, wherein the first ledger is a subsequent ledger and further comprises a hash of a previous ledger in the blockchain.

14. The system of claim 9, wherein the operations further comprise:
joining the blockchain with the one or more computing devices.

15. The system of claim 9, wherein the operations further comprise:
generating one or more third encrypted frames by encrypting one or more third media frames based on an encryption key;

transmitting, to the one or more computing devices, third data indicating a third ledger in the blockchain, the third ledger comprising a third decryption key configured to decrypt the one or more third encrypted frames and comprising a hash of the second ledger;

generating third data packets by packetizing the one or more third encrypted frames; and transmitting, to the one or more computing devices via the media server, the third data packets.

16. The system of claim 9, wherein the first ledger further comprises at least one of text data, Short Message Service (SMS) data, an electronic mail, or a static file.

17. A system, comprising:

a sending device comprising:

at least one first processor; and first memory storing first instructions that, when executed by the at least one first processor, cause the sending device to perform first operations comprising:

generating one or more first encrypted frames by encrypting one or more first media frames based on a first encryption key;

transmitting first data indicating a first ledger in a blockchain, the first ledger comprising a first decryption key;

generating first data packets by packetizing the one or more first encrypted frames;

transmitting, to a media server, the first data packets;

generating one or more second encrypted frames by encrypting one or more second media frames based on a second encryption key;

determining that greater than a threshold number of the first data packets have been transmitted or that greater than a threshold time has passed since the first data was transmitted;

based on determining that greater than the threshold number of the first data packets have been transmitted or that greater than the threshold time has passed since the first data was transmitted, transmitting second data indicating a second ledger in a blockchain, the ledger comprising a second decryption key configured to decrypt the one or more second encrypted frames and comprising a hash of the first ledger;

generating second data packets by packetizing the one or more second encrypted frames; and transmitting, to the media server, the second data packets; and a receiving device comprising:

at least one second processor; and second memory storing second instructions that, when executed by the at least one second processor, cause the receiving device to perform second operations comprising:

receiving, from the sending device, the first data indicating the first ledger;

receiving, from the media server, the first data packets;

restoring the one or more first encrypted frames based on the first data packets;

restoring the one or more first media frames by decrypting the one or more first encrypted frames using the first decryption key;

restoring first media data based on the one or more first media frames;

receiving, from the sending device, the second data indicating the second ledger;

receiving, from the media server, the second data packets;

restoring the one or more second encrypted frames based on the second data packets;

restoring the one or more second media frames by decrypting the one or more second encrypted frames using the second decryption key; and restoring second media data based on the one or more second media frames.

18. The system of claim 17, wherein the sending device further comprises:

a camera configured to detect a video; and a microphone configured to detect audio, and wherein the first operations further comprise:

generating the one or more first media frames based on the video and the audio.

19. The system of claim 17, wherein the receiving device further comprises:

a screen configured to output a video based on the first media data; and a speaker configured to output audio based on the first media data.

20. The system of claim 17, further comprising:

an external device comprising:

a camera configured to detect a video;

a microphone configured to detect audio;

a transceiver configured to transmit the first media data to the sending device;

at least one third processor; and third memory storing third instructions that, when executed by the at least one third processor, cause the at least one third processor to perform operations comprising:

generating the first media data based on the video and the audio.

* * * * *